(No Model.)

J. K. YODER.
AUTOMATIC RAILROAD GATE.

No. 306,890. Patented Oct. 21, 1884.

E. K. Campbell.
Hal. K. Campbell.

John K. Yoder.
Per L. D. Campbell.
Atty.

UNITED STATES PATENT OFFICE.

JOHN K. YODER, OF LIBERTY, LOGAN COUNTY, OHIO.

AUTOMATIC RAILROAD-GATE.

SPECIFICATION forming part of Letters Patent No. 306,890, dated October 21, 1884.

Application filed March 17, 1884. (No model.)

*To all whom it may concern:*

Be it known that I, JOHN K. YODER, a citizen of the United States, and a resident of Liberty township, in the county of Logan and State of Ohio, have invented a new and useful Automatic Railroad-Gate, of which the following is a specification.

Figure 1:
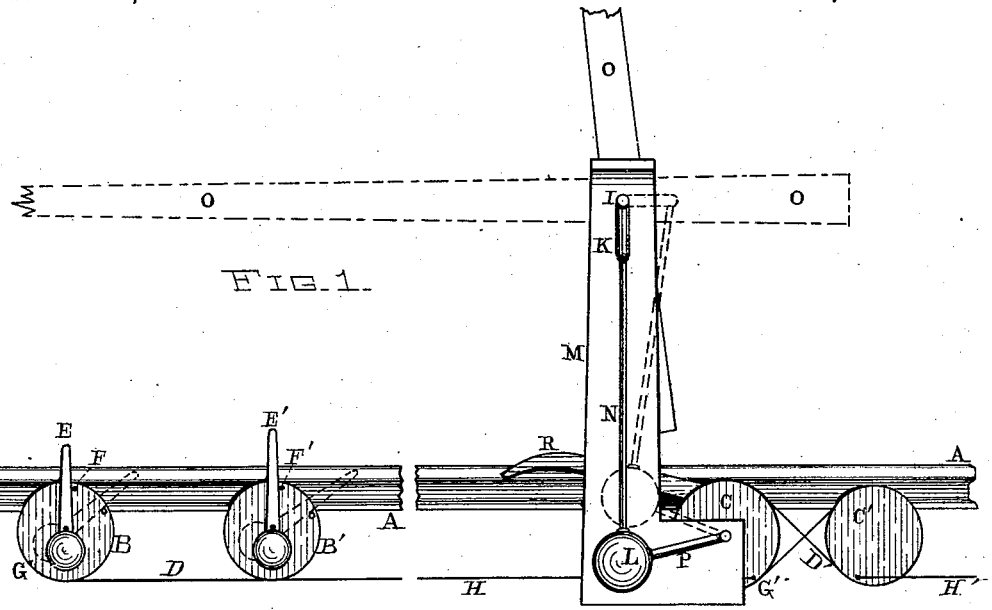
Figure 3:
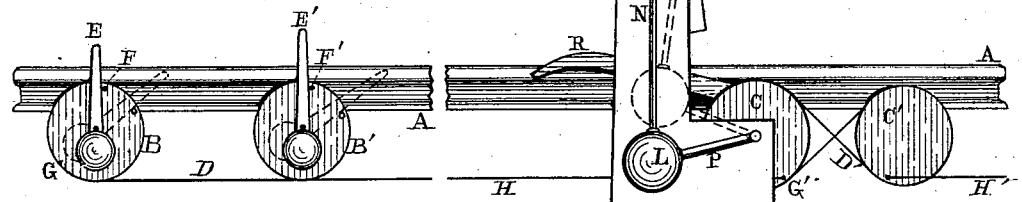
Figure 2:
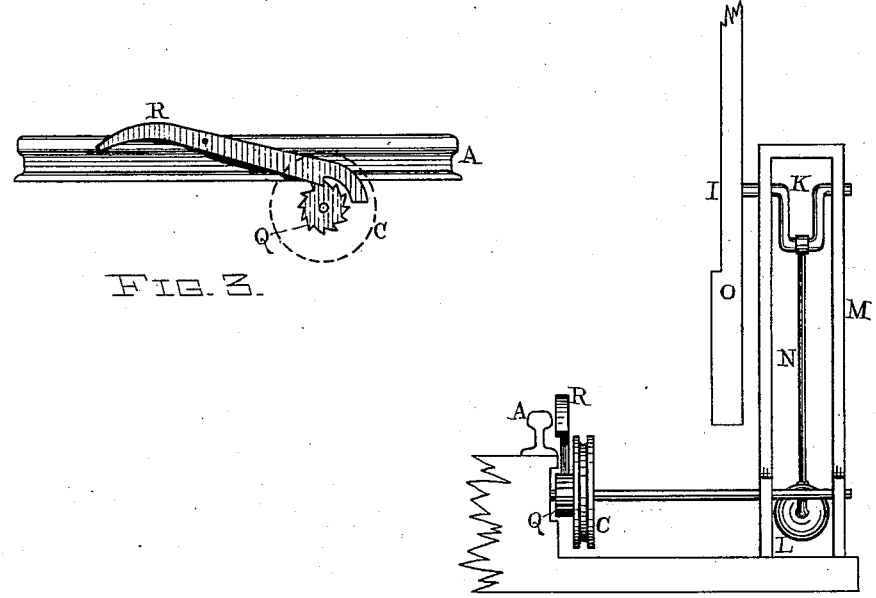

My invention consists of an improvement for gates at railroad-crossings of streets or roads, and is briefly described as follows:

Figure 1 is a side view showing the gate raised and held so by the weight attached to the crank on the axle of the gate, and also a view of the operating-wheels, levers, &c. Fig. 2 is an end view of the gate raised, with the crank held down by the weight, and of the wheel C, rail A, and trigger and ratchet-wheel. Fig. 3 is a view of the trip and ratchet-wheel which release the weight L as the train passes over the trip, allowing the gate to rise, the ratchet being fastened on the axle of wheel C, and the trip being pivoted at the side of the rail in such manner that the wheels of the train shall depress the front end of the trip and release the pawl from the ratchet.

A is the railroad-rail; B B′ C C′, the operating-wheels; D D′, rods, ropes, or chains connecting wheels B B′ C C′, (passing around B′;) E E′, standards operated by the wheels of the passing train to turn the wheels B B′ C C′; F F′, lugs on wheels B B′, against which standards E E′ press to turn the wheels; G G′, points at which the rod or rope D is fastened to wheels B C; H, rod connected with the wheel C′, and running to another pair of wheels similar to B B′, to operate another gate; I, pivot on which gate is hung; K, crank on end of pivot, to which is attached a weight, L, by rod N; M, standard or post on which gate is mounted; O, the gate; P, lever on the axis of wheel C, (attached to weight L,) which, as the wheel revolves, raises the weight and allows the gate to fall into position across the street; Q, ratchet on axle of wheel C, which prevents the wheel C from turning backward and letting the weight fall until the train passes; R, trigger and pawl which hold and release the ratchet Q, to hold the weight up or allow it to fall, and cause the wheels B B′ C C′ to resume their normal position, and cause the gate to rise.

The operation of my device is as follows: The wheels B B′ C C′ are pivoted at the side of the track, and so connected by ropes or rods D D′ that the turning of the wheels B B′ in the direction shown by the arrow will turn the wheel C in the same direction, and raise the lever P to the position shown in the dotted lines, which will raise the weight L correspondingly, and allow the gate O, which is not held in perpendicular by the weight L on crank K, to assume a horizontal position by the weight of the long arm of the gate overcoming that of the short arm. The turning of wheels B B′ C C′ is accomplished by the wheels of the train coming in contact with the standards E E′, which strike against lugs or pins F F′, and thus turn the wheels. The standards E E′ in practice are located immediately next the rail and weighted at the bottom, so as to assume a vertical position as soon as the train passes. Standard E′ is made longer than E, so that the work begun by the train striking E may be continued when it strikes E′. As the wheel C is turned in the direction shown by the arrow, it is held to the position reached by the pawl on the trigger R engaging with the ratchet Q on the axle of wheel C. As the train passes the gate, the wheels press upon the trigger R and release the pawl from the ratchet Q, allowing the weight L to fall and cause the gate to assume a vertical position again.

In the drawings I have brought wheels B B′ C C′ closer to each other than in practice, to show the principle in the drawings; but in practice the wheels B B′ are located a sufficient distance up the track to close the gate before the train gets near it, and in practice I generally turn the gate to point the opposite direction from wheels B B′.

I do not claim, broadly, the raising of a gate by means of rods and wheels; but

What I claim is—

The combination, with wheels B B′ C C′, ropes D, lever P, weight L, and crank K, of the standards E E′, trigger R, and ratchet Q, as and for the purpose set forth.

JOHN K. YODER.

Attest:
E. K. CAMPBELL,
M. KERNAN.